Dec. 4, 1928.  G. F. EGAN  1,693,978
SEWER CONSTRUCTION
Filed April 9, 1926   2 Sheets-Sheet 1

Fig. I.

Inventor
G. F. Egan
by James R. Bowen.
Attorney

Dec. 4, 1928.

G. F. EGAN 1,693,978

SEWER CONSTRUCTION

Filed April 9, 1926 2 Sheets-Sheet 2

INVENTOR
G. F. Egan
BY James R. Bowen
ATTORNEY

Patented Dec. 4, 1928.

1,693,978

UNITED STATES PATENT OFFICE.

GEORGE F. EGAN, OF JERSEY CITY, NEW JERSEY.

SEWER CONSTRUCTION.

Original application filed July 31, 1925, Serial No. 47,281. Divided and this application filed April 9, 1926. Serial No. 100,990.

The present invention relates to improvements in sewer construction and constitutes a division of my similarly entitled co-pending application, Serial No. 47,281, filed July 31, 1925.

An object of the invention described and claimed herein is to provide traps in the basin at points where the conduits connect with such basin for the further purpose of checking the entrance into the conduits from the basin of material which may clog the conduits.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a vertical sectional view of a basin, sewer and trap construction conforming to the present invention;

Figure 8 is a side view on an enlarged scale of a plug.

Figure 1:
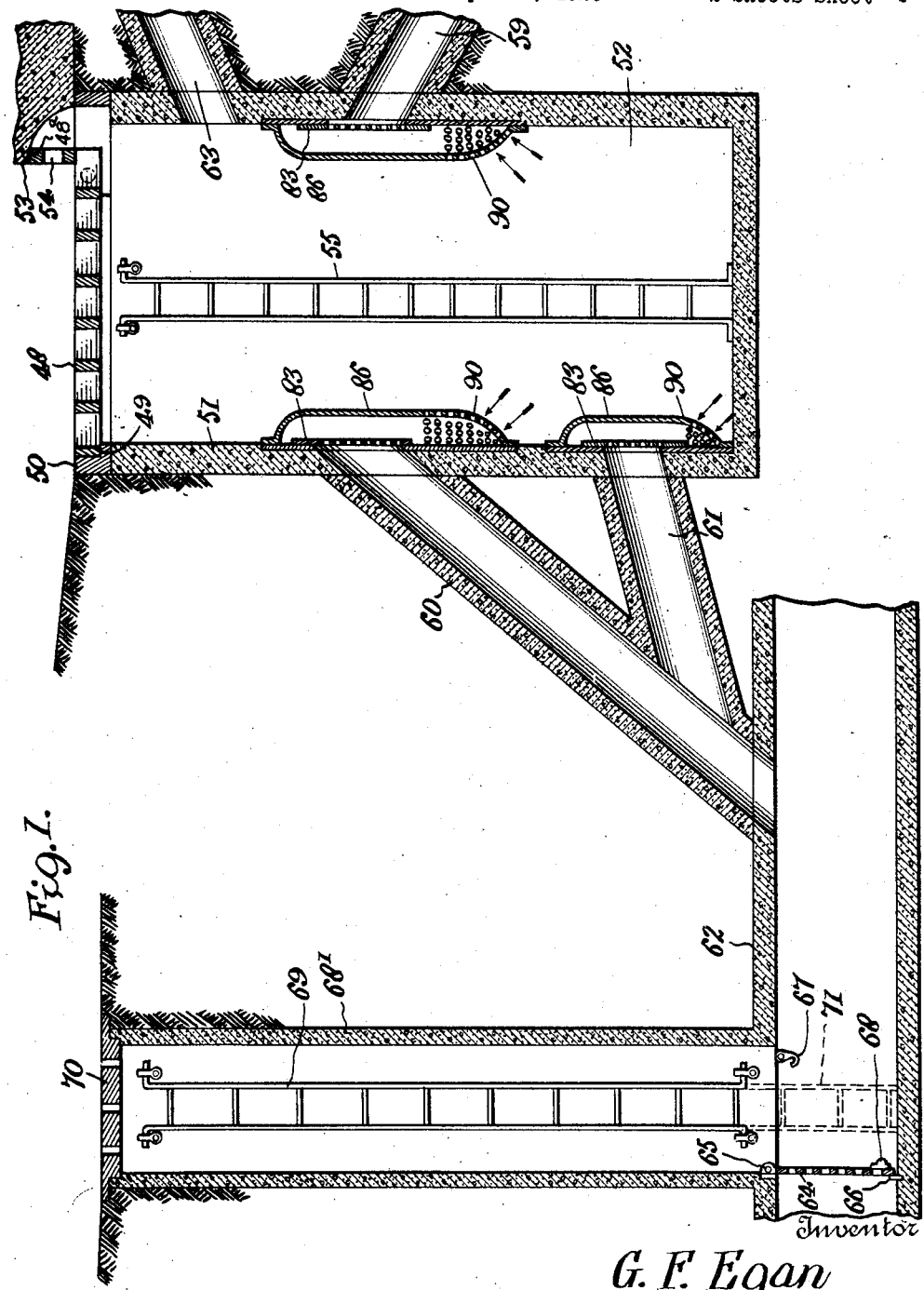
Figure 2:
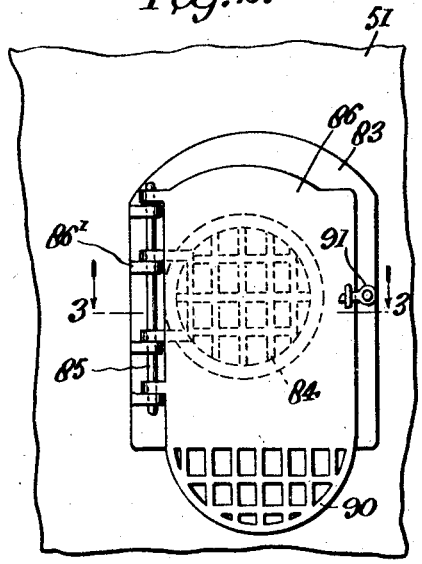
Figure 2 is a fragmentary elevation of the interior wall of a basin showing a trap in closed position.
Figure 4:
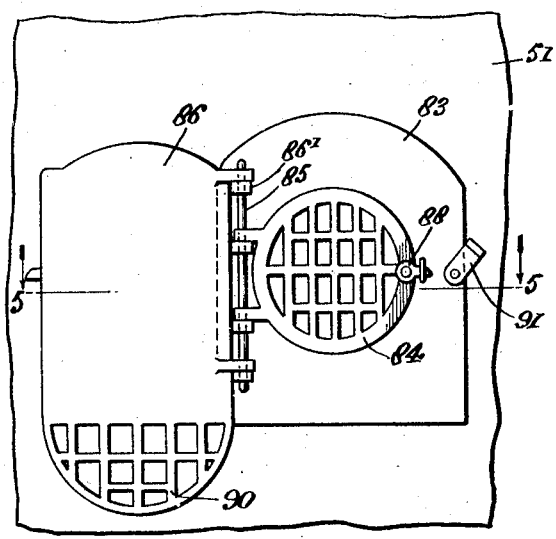
Figure 4 is a view similar to Figure 2 but with the trap open.
Figure 3:
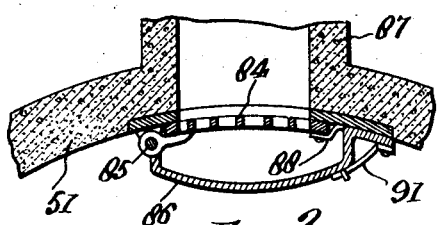
Figure 3 is a horizontal section taken on the line 3—3 in Figure 2.
Figure 5:
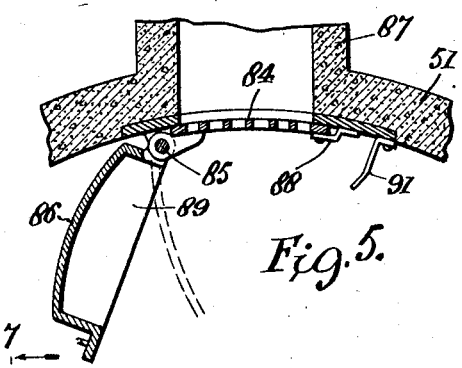
Figure 5 is a horizontal section taken on the line 5—5 in Figure 4.

Referring to the drawings, and for the present to Figure 1, 48, 48$^a$ designates a perforated cover the horizontal part of which is shown as seated upon a shoulder 49 of the horizontal part of frame 50. The frame 50 is shown as fitted upon the upper end of the wall 51 of a basin 52. The vertical part 48$^a$ of the cover will extend up within an opening in the curb. The horizontal part 48 of the cover is shown as provided with trunnions adapted to enter suitable slots in the horizontal part of the frame 50. The curb is shown as provided with a cut out portion 54. By raising the horizontal part 48 of the cover the cover as a whole may be rocked on the trunnions and the opening into the receiving basin uncovered. When the horizontal part of the cover has been rocked sufficiently far it will rest against the curb. The raising up of the horizontal part 48 will cause the vertical part 48$^a$ to move in the cut out portion 54 and this cut out portion 54 will be so shaped as not to interfere with the movement of the vertical part 48$^a$ therein. While I have shown the cover 48, 48$^a$ as circular in shape it will, of course, be readily understood that the cover may be of any desired shape, in which case the frame 50 may be made to conform to the shape of the cover.

It will, of course, be understood that as much of the basin as may be desired may be built under the sidewalk, leaving only, if desired, an opening in the street sufficiently large to permit an operator to enter the basin, and, if desired, instead of having a perforated cover of the type shown in the drawings any suitable opening and cover to the basin may be provided.

Within the basin 52 is shown a ladder 55 appropriately supported to enable operators to descend into the basin when the cover thereof is lifted. Pipes 59, 60 and 61 are shown as leading downwardly and out of the basin 52 at various elevations. A pipe 61 is shown as leading into the pipe 60 and may be a V-shaped pipe if desired. This pipe 60 is shown as connecting with a sewer indicated at 62. A pipe 63 is shown as leading downwardly and into the basin 52 and may carry fluid from another basin or any higher level. The pipes 60 and 61 may be made in one piece if desired.

A sewer 62 is shown as provided with a guard 64, this guard being shown as in the shape of a perforated door hinged at its upper end as indicated at 65 and adapted to abut at its lower end against a stop 66 which will restrict swinging movement of the door to maintain the door across the sewer and arrest large material passing through the sewer. A hook 67 is shown as pivotally mounted in the sewer at an appropriate point to engage with an eye 68 on the door 64, whereby to hold the door elevated when its use is not desired. Instead of the stop 66 any suitable means may be provided to restrict swinging movement of the door and any desired means might be employed to hold the door open. The space in the sewer in front of the door 64 is accessible through a manhole 68', in which is shown as placed a ladder 69, the manhole being shown as closed at the surface by a cover 70. An extension ladder 71 may be provided to let down into the sewer from the man-hole.

The guard 64 is desirable for discovering bodies that may have entered a sewer and for locating the approximate points at or about which these bodies entered the sewer.

Referring to Figures 2 to 8, inclusive, 51 designates the side wall of a basin in which a trap is mounted. This trap is shown as consisting of a plate 83 shown as mounted flush in the wall 51. This plate may serve as an attaching base for a perforated door 84 shown as hinged upon an elongated pintle 85. This pintle may also form an appropriate support for an outer door 86 shown as substantially semicircular in shape. This outer door is shown as larger than the door 84, the door 84 being shown as nearly of the same diameter as a pipe indicated at 87 in Figures 3 and 5. The perforated door 84 may cover the mouth of the pipe and be held closed by a suitable latch 88. The outer door 86 is shown as imperforate for its major portion and for all of that portion extending in front of the perforated inner door 84. The outer door is shown as provided with upper and lower flanges 89 which close against the plate 83 and prevent the entrance of substances except at the lower perforated portion 90 of the outer door. In this way fluid may be let in through the portion 90 and thence passes upwardly and out through the inner perforated door 84. A latch 91 is shown as provided to hold the outer door 86 closed. If desired the inner door 84 may be dispensed with. By disposing the doors at a suitable angle the doors might be held closed by their own weight and the necessity of latches or other means for holding the doors closed might be avoided.

Figure 7:
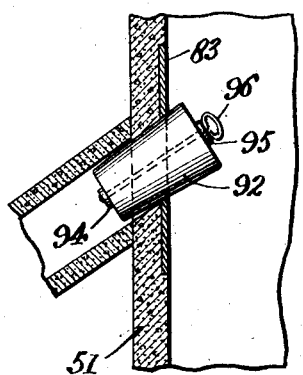
Figure 7 is a vertical section taken on the line 7—7 in Figure 6.
Figure 6:
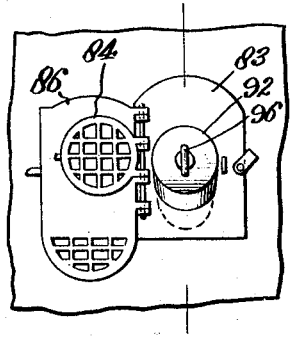
Figure 6 is a view on a reduced scale similar to Figure 4 showing a perforated plate open and a plug inserted in a conduit.

In Figures 6, 7 and 8 a plug 92 is shown for closing the ends of the pipes leading into or from the basin 52 during the time that an operator is engaged in cleaning out or repairing the basin or whenever else it is desired to plug the pipes. These plugs prevent noxious gases from getting into the basin and also prevent liquids and solids from entering the basin from the pipe in which the plug has been inserted. The plug 92 is shown as consisting of a frustum of a cone of suitable material and as reinforced by a rod 93 extending through the center thereof and upset upon washers 94 and 95 at its inner and outer ends, the rod being shown as formed into a handle 96 at the outer end to enable the plug to be inserted, removed or carried. A suitable nut may be fitted against the washer 94.

It is obvious that various changes and modifications may be made in the details of construction and design of the above specifically described embodiment of this invention without departing from the spirit thereof.

What is claimed is:—

1. A sewer construction comprising a basin having an outlet opening, a perforated inner door secured over said opening, and an outer door secured in spaced relation about the inner door and comprising an imperforate upper portion and a perforated lower portion.

2. A sewer construction comprising a basin having an outlet opening, an inner perforated hinged door for closing the opening, an outer hinged door spaced from the inner door and said outer door having a major upper imperforate portion opposite the inner door and a lower perforated portion below said inner door.

3. A sewer construction having an outlet opening comprising a perforated member for fitting over said opening, and a second member fitting about the opening and spaced from the first member, said second member having an imperforate portion extending opposite the perforated inner member and having also a perforated portion offset from the first mentioned perforated member.

In testimony whereof I affix my signature.

GEORGE F. EGAN.